(No Model.) 4 Sheets—Sheet 1.
T. R. TIMBY.
TOWER AND SHIELD SYSTEM OF FORTIFICATIONS.
No. 312,230. Patented Feb. 10, 1885.
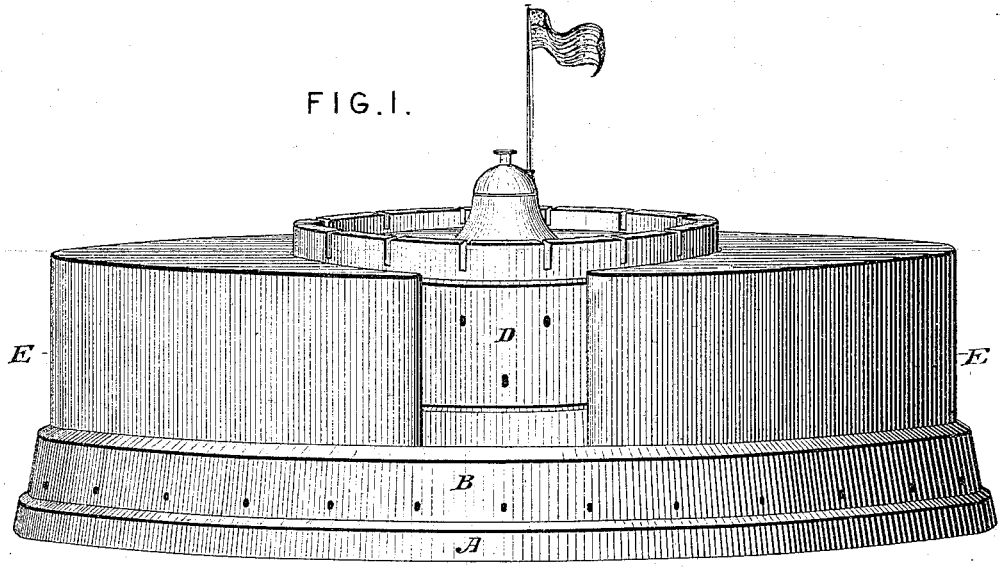
FIG.I.
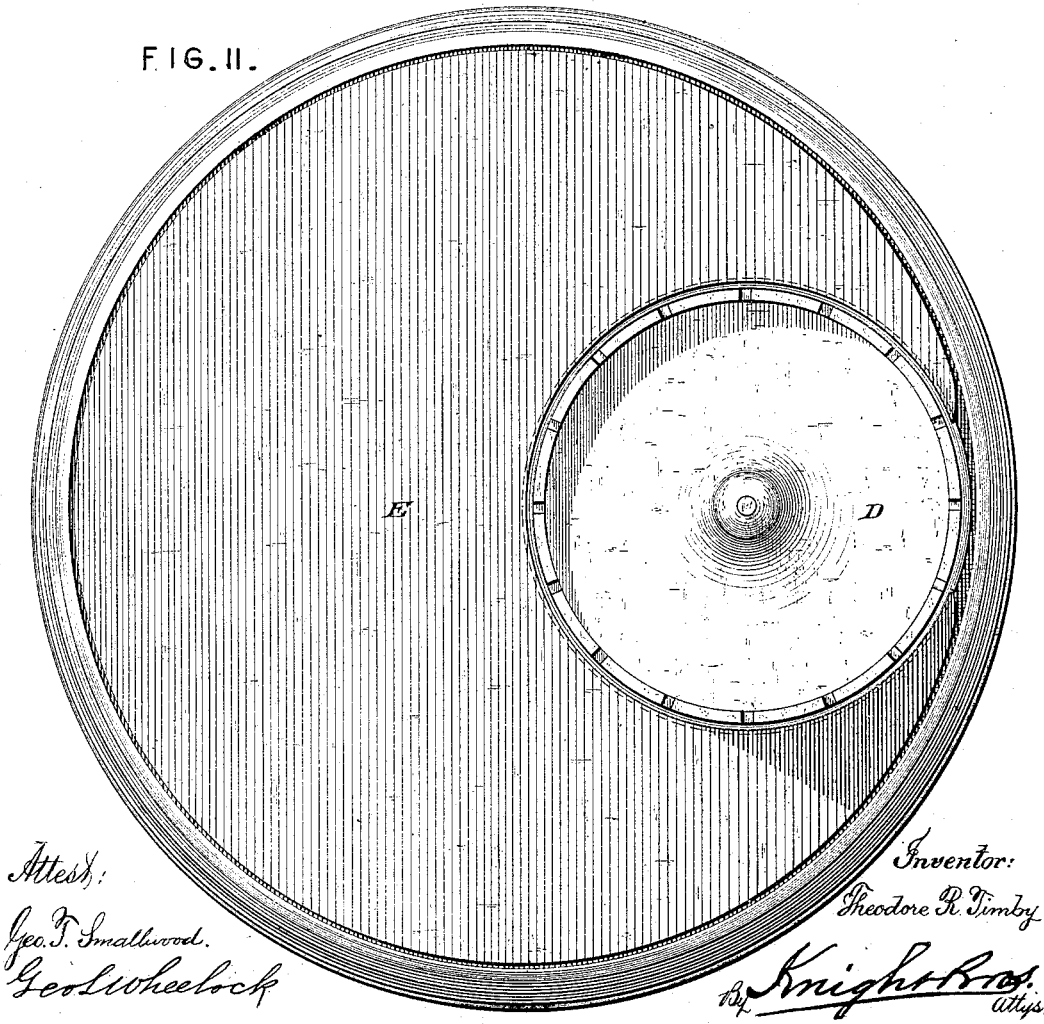
FIG.II.

(No Model.) 4 Sheets—Sheet 2.
T. R. TIMBY.
TOWER AND SHIELD SYSTEM OF FORTIFICATIONS.
No. 312,230. Patented Feb. 10, 1885.
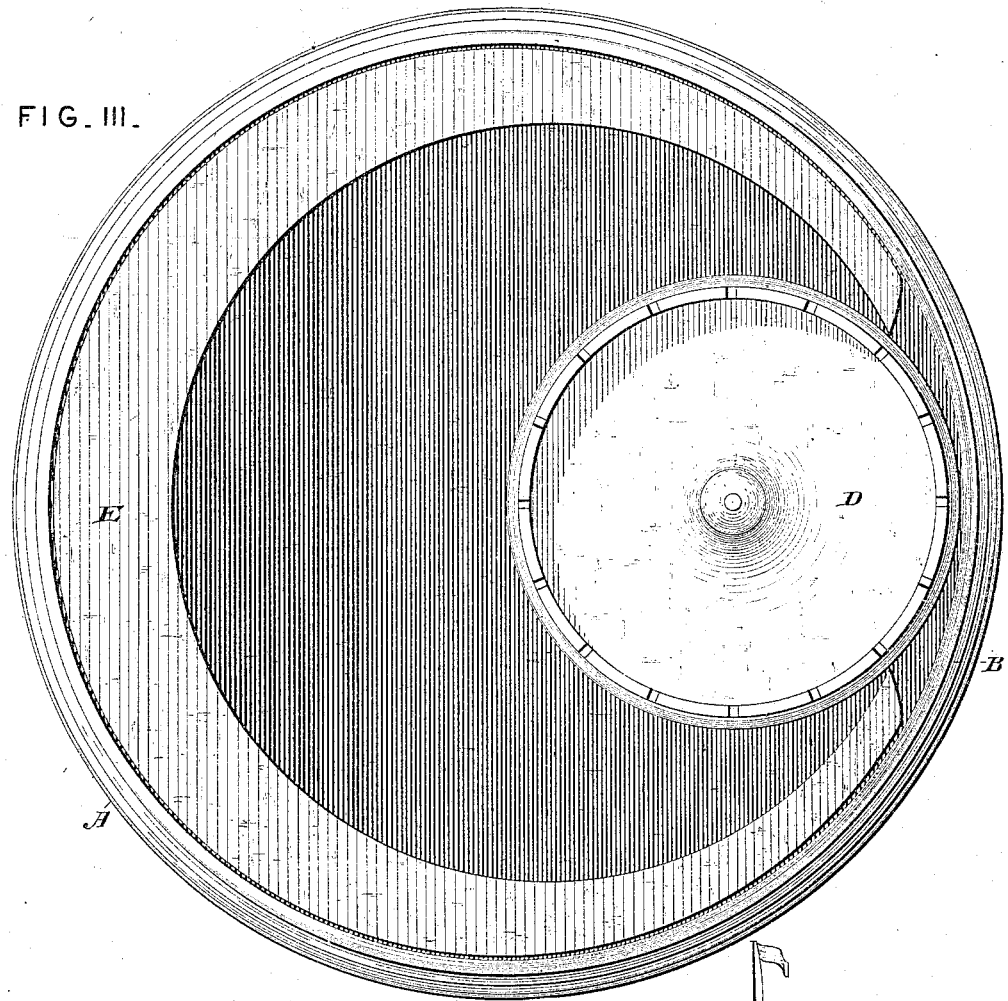
FIG. III.
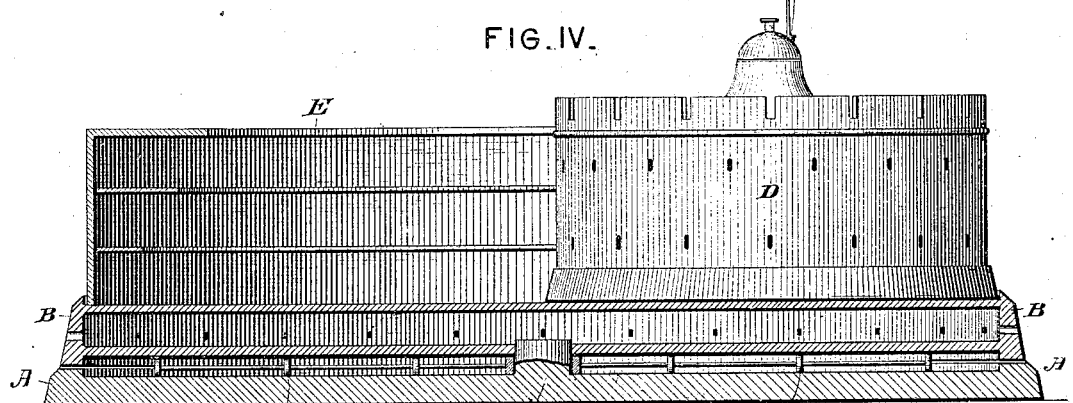
FIG. IV.

(No Model.)
T. R. TIMBY.
TOWER AND SHIELD SYSTEM OF FORTIFICATIONS.
No. 312,230. Patented Feb. 10, 1885.
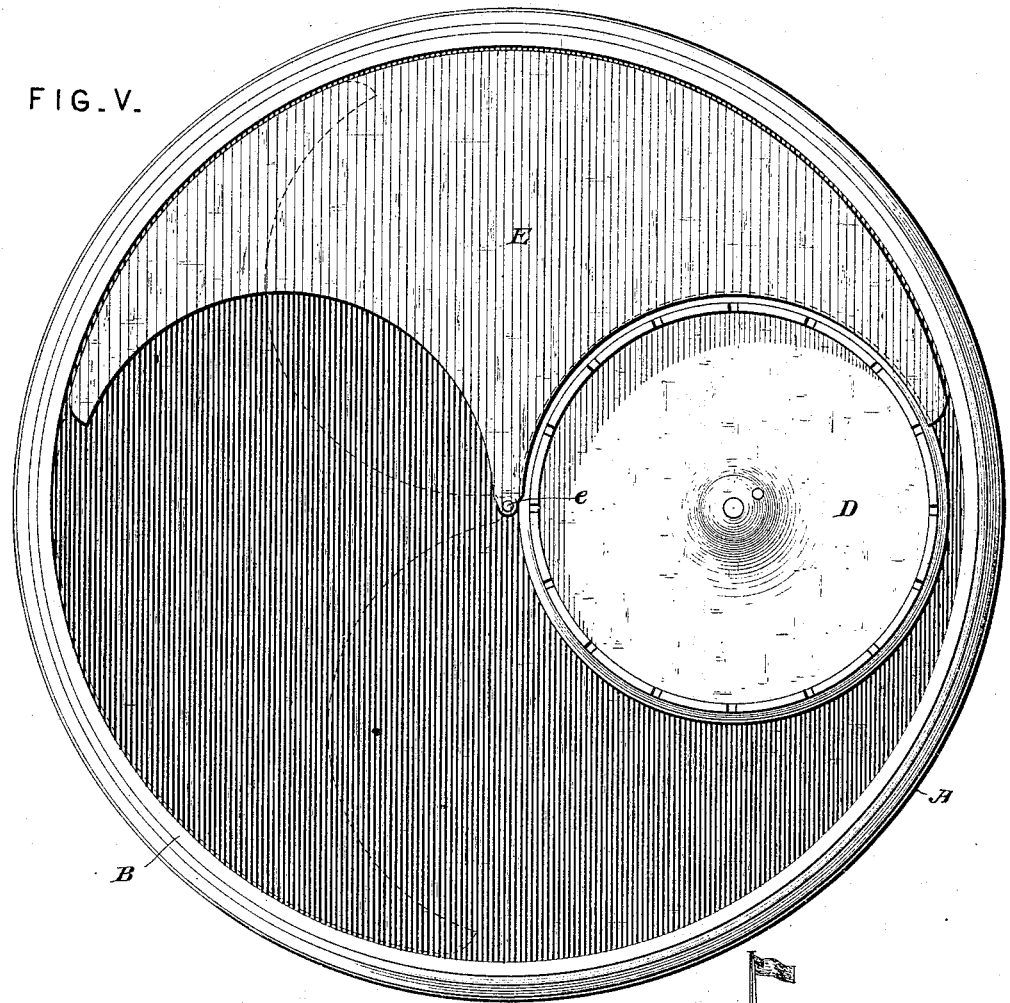
FIG. V.
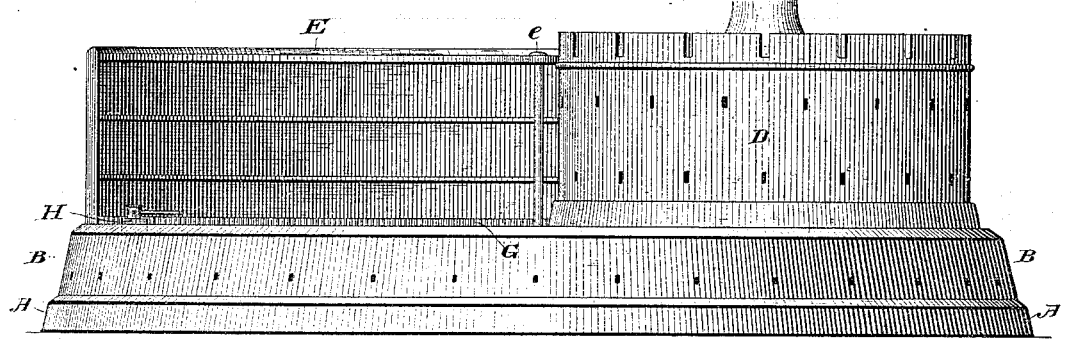
FIG. VI.

(No Model.) 4 Sheets—Sheet 4.
T. R. TIMBY.
TOWER AND SHIELD SYSTEM OF FORTIFICATIONS.
No. 312,230. Patented Feb. 10, 1885.
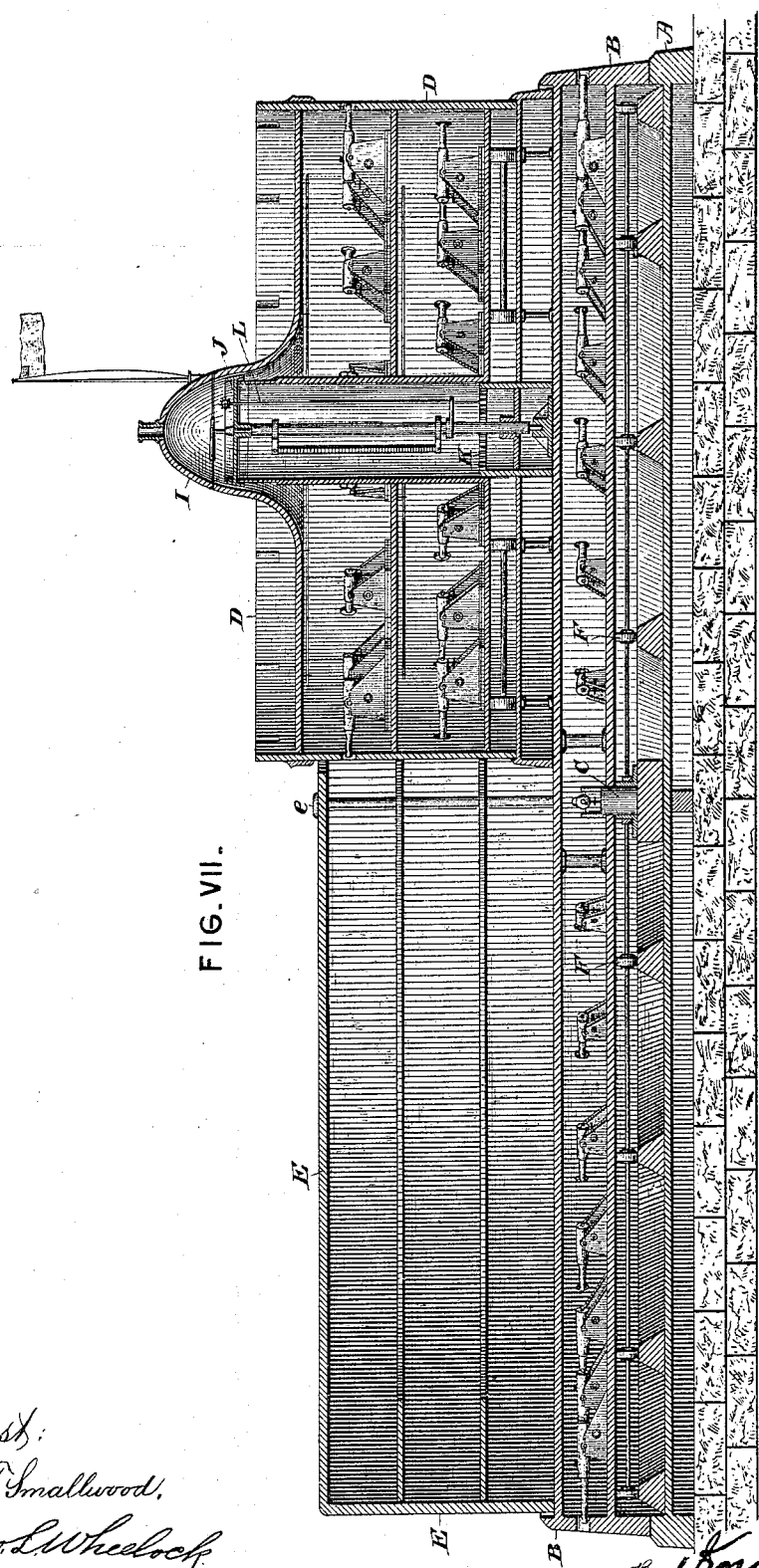

UNITED STATES PATENT OFFICE.

THEODORE R. TIMBY, OF NYACK, NEW YORK.

TOWER AND SHIELD SYSTEM OF FORTIFICATIONS.

SPECIFICATION forming part of Letters Patent No. 312,230, dated February 10, 1885.

Application filed December 5, 1884. (No model.)

*To all whom it may concern:*

Be it known that I, THEODORE R. TIMBY, a citizen of the United States, residing at Nyack, in the county of Rockland and State of New York, have invented certain new and useful Improvements in Fortifications, of which the following is a specification.

My invention is denominated the tower and shield system of fortifications.

The subject of the invention is a tower mounted to revolve on a disk, base, or platform, and a shield capable of rotation, either by the rotation of the said base or platform or independently thereof, so as to protect the whole or any desired portion of the rear of the tower, while exposing its front in any desired direction for action.

In carrying out my invention I prefer to employ a revolving tower mounted upon a disk or base, which is itself mounted so as to revolve on its center to the right or left, and carries a shield, either fixed to the said revolving or oscillating disk or platform, or having an independent oscillation or revolving motion relatively thereto.

In order that the invention may be more clearly understood, I will proceed to describe it with reference to the accompanying drawings, which illustrate the embodiment of my said invention under different forms.

Figure I is a perspective view of the tower and shield, the shield being mounted upon a revolving disk or base arranged to completely cover and inclose the rear and flanks of the tower, exposing only a narrow front for action. Fig. II is a plan or top view of the same. Fig. III is a plan or top view illustrating a modification, in which the shield is constructed in the form of a crescent with an open top, so as to admit light while protecting the rear and flanks of the tower. Fig. IV is a vertical section of the shield and revolving base represented in Fig. III, showing the tower in elevation. Fig. V is a plan or top view of the tower and revolving base, with an oscillating shield adapted to move independently of the base or together therewith, and to protect or mask the rear of the tower in any direction to any desired extent. Fig. VI is an elevation of the embodiment of the invention shown in Fig. V. Fig. VII is a vertical section of the tower, shield, and revolving base, showing their interior arrangement.

A represents a fixed bed of any suitable construction, on which a circular disk, base, or platform, B, is mounted to revolve on a vertical axis, C.

On the revolving base B is a tower or turret, D, mounted to revolve on its own vertical axis independently of the revolving base, or to be carried in an orbital motion by the revolution of the base B.

Upon the revolving base B is mounted a shield, E, arranged to mask and protect the rear of the tower D, while exposing any desired portion of its front for action. The independent revolution of the tower D upon its base B, and the revolution of the base B, carrying the tower D with it, may be effected by rack and pinion or any adequate and suitable means, suitable machinery for this purpose being well known in the art.

I have shown in Fig. IV, for the purpose of illustration, anti-friction wheels or rollers F, on which the base B turns. It will be apparent that the revolution of the base B presents the working front of the tower D in any desired line or direction to confront an enemy at any point on the horizon, while the rear of the said tower, where the guns are not in action, is effectually protected from the enemy's fire by the shield E. The independent rotation of the tower D brings its guns successively in line for firing with any desired rapidity in the desired direction.

Figs. V and VI show a modification in which the shield E is adapted to turn on a vertical axis, $e$, upon the revolving base B, so as to be capable of adjustment relatively to the tower D, as indicated in dotted lines, independently of the movement of the platform B. The dotted lines show the shield E moved ninety degrees, or more, from the position shown in the full lines, and it will be apparent from the construction that it is adapted to move one hundred and eighty degrees, or thereabout, and in this extent of movement to protect any desired part of the rear of the tower, and that while the shield shown in Fig. V is fixed in the position there represented, or in any other position to which it may be adjusted, it protects at all times two-thirds, or thereabout, of the rear and flanks of the tower; and, further, that without the relative movement of the shield upon the revolving base the construction of the shield shown in Figs. V and VI may be used to protect the rear of the tower in any direction desired by the rotation of the base B, carrying the tower D and shield E with it. It will thus appear, further, that by the employment of the revolving base B and an independently-revolving or oscillating shield E, an effectual mask and guard is provided for the rear of the tower in any desired direction, even though the revolving mechanism of either the base B or the shield E may become disabled from any cause.

The shield E may be made of iron or steel of any required weight to provide absolute protection against heavy shot or shell.

As a simple device for moving the shield upon the revolving base B, I have shown in Fig. VI a rack, G, and pinion H; but any suitable mechanism may be used for this purpose.

The sectional view, Fig. VII, shows a tier of guns in the revolving base B and two tiers in the revolving tower D, also a dome or lookout, I, in the tower containing a platform, J, revolved independently of the tower by a rack, K, and pinion-shaft L, permitting the officer to scan the horizon at will and to sight his guns from this point.

The combination of a revolving or oscillating tower and an independent protecting-shield adjustable relatively thereto is described and claimed in my application filed January 3, 1885. For this reason the claims in my present application relate to a revolving or oscillating tower and a protecting-shield adjustable relatively to said tower, both being mounted on a revolving or oscillating disk.

Having thus described my invention, the following is what I claim as new therein and desire to secure by Letters Patent:

1. The combination of a revolving tower, a revolving or oscillating disk or base, on which said tower is mounted, and a shield mounted on the revolving disk so as to be adjustable in direction relatively to the tower, substantially as set forth.

2. The combination of the revolving or oscillating base B, revolving tower D, mounted thereon, and the shield E, adjustable relatively to the tower by the movement of the base B.

THEODORE R. TIMBY.

Witnesses:
OCTAVIUS KNIGHT,
L. M. HOPKINS.